(No Model.)

D. W. CURTIS.
STEAM MUFFLER.

No. 592,000. Patented Oct. 19, 1897.

Attest;
C. C. Burdine.
J. M. Pond.

Inventor;
David W. Curtis,
by Dodge and Sons, Att'ys.

UNITED STATES PATENT OFFICE.

DAVID W. CURTIS, OF FORT ATKINSON, WISCONSIN.

STEAM-MUFFLER.

SPECIFICATION forming part of Letters Patent No. 592,000, dated October 19, 1897.

Application filed February 23, 1897. Serial No. 624,513. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Steam-Mufflers, of which the following is a specification.

My invention relates to apparatus in which steam is used for heating milk and its products in creameries or factories for making butter, cheese, &c.; and the invention consists in what I term a "muffler" or device for preventing the noise made by the steam when injected into the water, as hereinafter more fully set forth.

Figure 1:
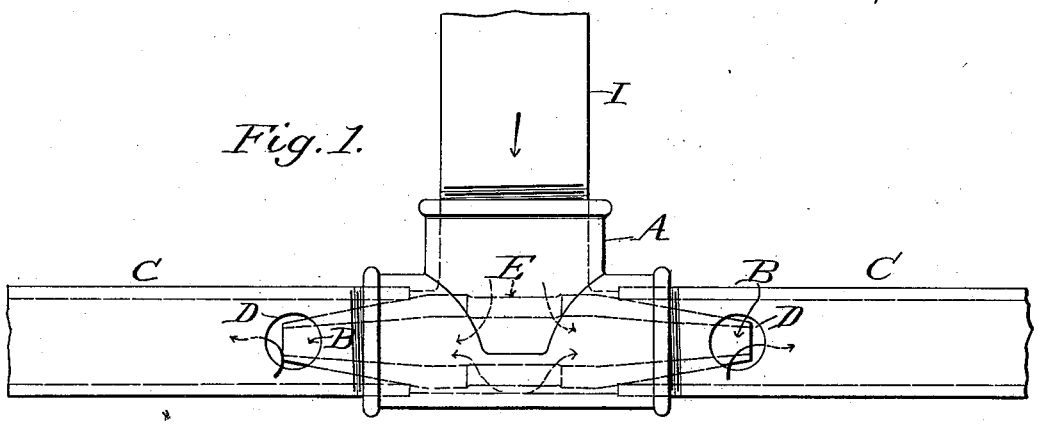
Figure 2:
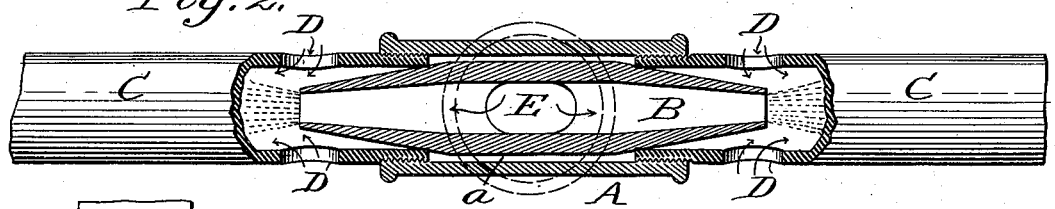
Figure 4:
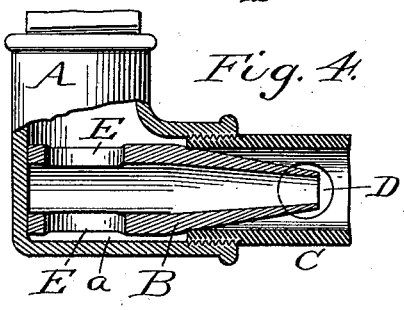
Figure 3:
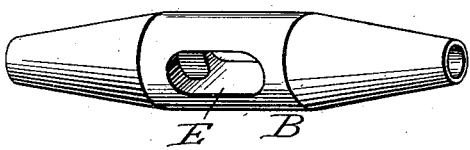

Figure 1 is a side elevation of the muffler. Fig. 2 is a top plan view with a portion broken away to show the interior. Fig. 3 is a perspective view of the inner tube detached. Fig. 4 is a view showing a modification of the device, and Fig. 5 is a plan view showing the arrangement of the device as used in a tank.

It is customary in creameries or other establishments for treating milk and cream to heat the milk or cream by means of water which is heated by the injection of steam into the water. This injection of the steam into the water produces a loud and disagreeable noise which interferes with conversation, and prevents orders from being readily heard and understood. It is to remedy this difficulty that my invention is designed, and it is constructed as follows: I take a piece of pipe A of the form known as a T or T-socket, and provide two pipes C of the proper size to be screwed into the ends of the socket or pipe A, as shown in Figs. 1 and 2. I also make a pipe B of the form shown in Fig. 3, it having its ends made conical or tapering, as shown, and having an elongated opening made in its opposite sides at the center, at right angles to the longitudinal bore of the same. This pipe B is made somewhat smaller in external diameter than the bore of the socket A, so that when inserted therein a small annular space $a$ will be left between them, as shown in Fig. 2. This pipe B, I prefer to make of soft metal, so that when placed in position the ends of the pipes C when screwed up tight will embed themselves in the soft metal sufficiently to form a steam-tight joint, and which if made of iron or similar hard metal would necessitate the turning, grinding, or otherwise machining of these parts. In each of the pipes C, just back of the tapered ends of the inner pipe B, I make two holes D, they being directly opposite each other, as shown in Fig. 2.

An obvious modification is shown in Fig. 4, in which the device is shown single instead of double. In this case a right-angled socket is substituted for the T-socket, the inner pipe B having but one tapered end instead of two, its opposite end being made solid or closed in any manner preferred. In all other respects the construction and arrangement of parts is the same. This form is adapted to be used in some places where the other form cannot be conveniently, as it has but a single discharge-pipe C, while the double one has two. Its principle and mode of operation, however, are the same.

Figure 5:
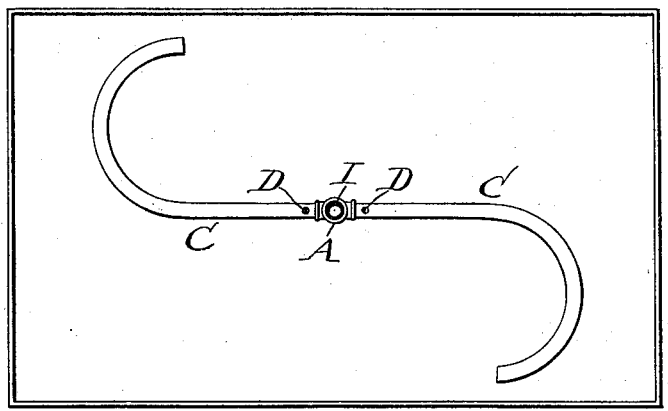

As it is desirable in the heating of milk or cream, especially in the process of pasteurization or sterilization of the same, to heat the mass uniformly, the pipes C are curved near their ends, as represented in Fig. 5, so that the discharge therefrom will impart motion to the water in the tank T, and thus keep up a continuous and thorough circulation of the water, thus securing a uniform temperature throughout the mass. It is obvious that these curved ends may be turned or set so as to discharge horizontally or vertically, or at any intermediate angle, and which of course will depend upon the shape of the tank or apparatus in which the muffler is to be used.

The operation of the device is as follows: It being attached to the steam-pipe I, which may enter the tank at side or bottom, wherever most convenient, the steam enters the socket A and fills the space $a$ all around the inner pipe B, which it enters through the openings E, and is discharged at the ends of said pipe B within the tubes C. As the steam passing from the ends of the inner pipe B tends to create a vacuum at those points water is drawn in through the holes D, and this water mingling with the steam entirely prevents or suppresses the noise which would otherwise be created.

It is obvious that the holes D may be on the sides or on the top and bottom of the pipes C, but where the muffler rests on the bottom of the tank it is better to have them on the sides, as that arrangement permits the water to enter more freely. So, too, it is obvious that more than two holes may be used; but as I find it to work well with but two holes placed opposite each other, as shown, I prefer to so arrange them.

The device as a whole is simple, can be cheaply made, and produces a most useful result.

Having thus described my invention, what I claim is—

1. A steam-muffler consisting of a pipe or socket in combination with an inner pipe of less diameter with central openings and having tapering ends, and the pipes C provided with holes D and having their inner ends fitted tight upon the tapering ends of the inner pipe, whereby they hold the latter centrally in place and form tight joints, substantially as shown and described.

2. The soft-metal tube B provided with central openings and having its ends made conical or tapering as shown and described, whereby it is adapted to form tight joints with the surrounding pipes without any machining or fitting of the parts as set forth.

In witness whereof I hereunto set my hand in the presence of two witnesses.

DAVID W. CURTIS.

Witnesses:
L. GOSSELIN,
T. J. OWENS.